Aug. 14, 1928.
W. C. STARBUCK
1,680,575
HINGE SPACING GUAGE HEAD
Filed May 24, 1926
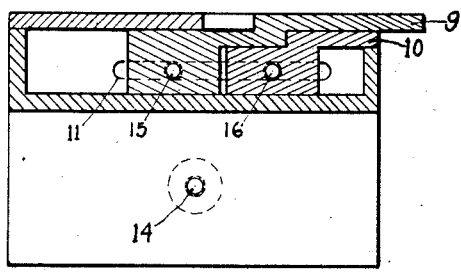
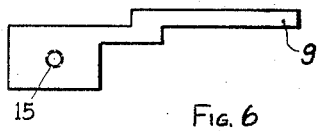
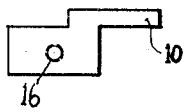
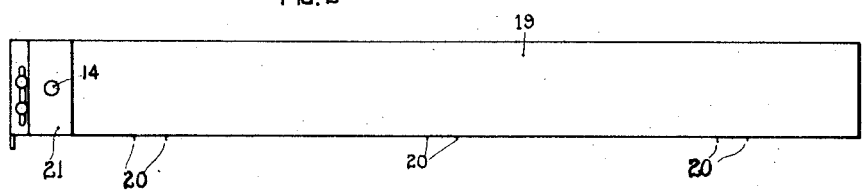
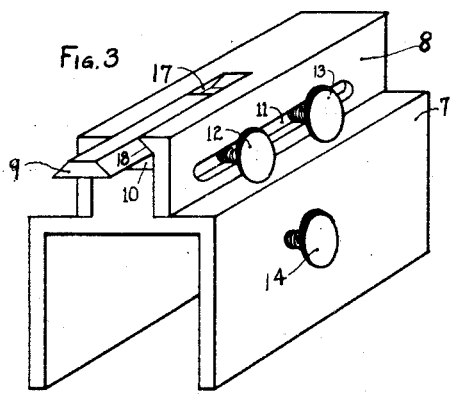
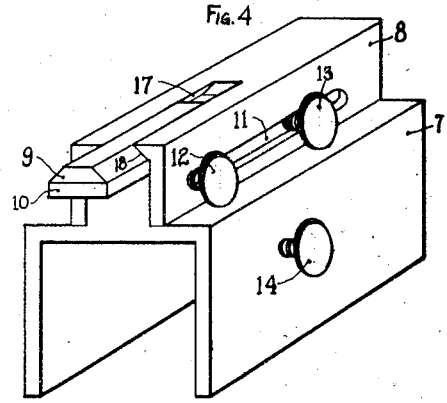
INVENTOR.
William Clayton Starbuck Patented Aug. 14, 1928.

1,680,575

UNITED STATES PATENT OFFICE.

WILLIAM CLAYTON STARBUCK, OF VAN NUYS, CALIFORNIA.

HINGE-SPACING GAUGE HEAD.

Application filed May 24, 1926. Serial No. 111,446.

This invention relates to improvements in hinge spacing devices; and, among the objects of the improvement are: first, to provide a gauge head, of the general character referred to, with a gauge member or members that may be caused to protrude suitably for hooking over the tops of doors but that may nevertheless be retracted or caused to recede when placed against upright elements of door jambs; second, to provide a gauge head with parts that may be shifted to vary the clearance provided at the tops of doors,—said gauge head being used in conjunction with a linear member such as a substantially rigid straight-edge, and said straight-edge being preferably fitted with means, such as metal points, to establish the location of hinges upon doors and door jambs, with the desired clearance at the top of said doors. Thus it is obviously a general object of this invention to provide against errors in the placement of hinges, and to save time and labor in the hanging of doors thereby; and preferred embodiments of my invention may each comprise a plurality of spacing or gauge members respectively providing surfaces which are movable relatively to one another and movable also relatively to a housing,—said housing being preferably provided with means for its removable attachment to said straight-edge.

One advantageous form of my invention is illustrated in the accompanying drawing, in which Fig. 1 is a cross sectional view, through the center of the device referred to.

Fig. 2 is a plan view of the device, as used in conjunction with a straight-edge.

Fig. 3 is a perspective view of the device, as it appears with the first or upper movable gauge member in extended position.

Fig. 4 is a perspective view of the same device, as it appears with both the mentioned gauge member and an auxiliary gauge member extended.

Fig. 5 is an elevational view of the upper movable gauge member.

Fig. 6 is an elevational view of the auxiliary gauge member.

In that embodiment of my invention chosen for purposes of illustration, a removable gauge head is provided with a straight-edge receiving part or base 7. In case this base is provided with a housing member 8, the latter may be positioned at the top of said base, to constitute a main frame-work for the device; and an upper or main movable gauge member 9 is shown as slidably secured flush with the top of the housing 8. For the indicated purpose, the main gauge member 9 may be provided with a beveled edge, somewhat as shown at 17—18 in Figs. 3 and 4; and to provide for varying the clearance at the top of the door, in case such clearance is desired to exceed the thickness of the gauge member 9, an auxiliary gauge member 10 may also be housed, under the upper gauge member 9, in such manner as to permit the mentioned gauge members to be projected or retracted either separately or together.

Handles in the form of thumb screws 12 and 13 are shown as threaded into holes 15 and 16, tapped in the gauge members 9 and 10 respectively; and said handles may, if desired, both operate through a single slot 11; and they may serve respectively to fix the respective positions of said gauge members, hold the same parallel with the top of the housing 8 and with one another, during movements of advance or retraction.

Means such as an additional set screw 14 may serve to secure my described hinge-spacing head to a substantially rigid linear member such as a straight-edge 19,—shown as interfitting therewith at 21; and metal points 20 may be so disposed as to conform to and indicate the proper location of hinges, to afford a desired clearance between the top of a door and the jamb element thereabove.

In the use of my novel hinge-spacing gauge, (any desired number of members being provided, and any appropriate number of said gauge members being simultaneously used, according to the desired clearance above a door) the lower surface of the lowermost protruding gauge member may be caused to rest against the top of a door, of the requisite dimensions, during the marking of said door by means such as the mentioned points 20; and thereafter the top surface of the spacer head, or the upper surface of the gauge member 9, if flush therewith, may be gently pressed upward and thereby caused to rest against the lower surface of the upper horizontal element of the jamb or frame within which the said door is to be hung. The clearance above the door, when hung, will then correspond (assuming the door and the opening to be square and true) to the vertical distance between the upper surface of the upper gauge member and the lower surface of the lower gauge member,—regardless of the number of gauge members employed and the means provided to vary said distance. It will be understood that the mere positioning of said gauge against the vertical jamb or frame element, to establish the proper position for attachment of hinges thereto, may be automatically effective to force any protruding gauge elements back into the housing 8, or its equivalent.

Assuming the points 20 to be integral with the linear element 19, and no change to be made in the connection effected by means of the set screw 14, or its equivalent, it will thus be seen that the spacing of hinge elements from the tops of jambs or door frames may be entirely uniform,—only the clearance at the tops of doors being varied, as for the purpose of allowing for enamel, paint or mere stain.

Although I have herein described a single complete embodiment of my invention, it should be understood not only that various features of my invention might be independently employed but also that numerous modifications thereof might be devised, by those skilled in the art to which this case relates, without the slightest departure from the spirit and scope of my invention, as the same is indicated above and in the following claim.

I claim as my invention:

In a hinge spacing gauge, a head comprising: a housing member, gauge members separately movable in said housing member and having portions adapted to be projected from said housing member,—one of said portions being provided with a jamb-engaging upper surface and each of said portions being provided with a door-engaging lower surface.

WILLIAM CLAYTON STARBUCK.